March 10, 1970 J. L. MEININGER ET AL 3,499,599
COMPRESSOR GOVERNOR HAVING FLUIDIC DEVICES
Filed July 25, 1968 2 Sheets-Sheet 1

INVENTOR.
JAMES L. MEININGER
BY DONALD BROWN

ATTORNEY

INVENTOR.
JAMES L. MEININGER
DONALD BROWN
BY
ATTORNEY

United States Patent Office 3,499,599
Patented Mar. 10, 1970

3,499,599
COMPRESSOR GOVERNOR HAVING
FLUIDIC DEVICES
James L. Meininger, Irwin, and Donald Brown, Monroeville, Pa., assignors to Westinghouse Air Brake Company, Wilmerding, Pa., a corporation of Pennsylvania
Filed July 25, 1968, Ser. No. 747,600
Int. Cl. F04b 49/02, 49/08; F04f 11/00
U.S. Cl. 230—17
7 Claims

ABSTRACT OF THE DISCLOSURE

A compressor governor in which a plurality of interconnected fluidic devices sense predetermined upper and lower limits of a main reservoir pressure range and position an interface valve device to operate start-stop or load-unload compressor control means to maintain a main reservoir pressure within the predetermined pressure limits. The upper and lower limits of the pressure range may be individually varied to shift the range or provide broader or narrower ranges of operation.

BACKGROUND OF INVENTION

In present day fluid compressors, the compressor control mechanism, whether of the start-stop type or of the load-unload type, is controlled by a governor mechanism which senses predetermined upper and lower pressure limits in the main reservoir to correspondingly operate the compressor control mechanism to maintain the main reservoir pressure within the prescribed pressure limits. The governor mechanisms are comprised of valve mechanisms which are subject to wear and therefore require high maintenance costs.

SUMMARY OF INVENTION

It is the object of the present invention to provide a durable, low maintenance compressor governor mechanism comprising pure fluid devices eliminating moving parts and reducing maintenance costs.

In the present invention, this object is achieved by providing at one of two control inputs of a pure fluid OR-NOR device the output pressure of a proportional amplifier, which output pressure is proportional to main reservoir pressure as provided by way of a pressure dropping choke at a control input of the proportional amplifier. The pressure at the one control input of the OR-NOR devices opposes a variable bias pressure so that when main reservoir pressure increases to an amount sufficient to provide a pressure to overcome the bias, the OR-NOR device switches to pressurize its OR output thereby positioning an interface valve device to permit main reservoir pressure to open a pressure switch in the compressor motor circuit or to operate a compressor unloading valve, depending upon the type of compressor control apparatus being utilized. The OR-NOR device includes a latching loop connecting the OR output to the other control input in additive cooperation with the one control input so that as main reservoir pressure reduces, the inherent hysteresis of the OR-NOR device will prevent pressurization of its NOR output until main reservoir pressure has reduced a predetermined amount relative to the bias input, thereby permitting the OR-NOR device to switch pressurization to its NOR output. The NOR output, when pressurized, positions the aforesaid interface valve device to reset the pressure switch or the unload valve to operate the compressor to pressurize the main reservoir. The bias control of the OR-NOR device is variable to change the upper pressure limit of the main reservoir pressure. The proportional amplifier is provided with a variable bias opposing the control input to change the lower limit of main reservoir pressure, as desired.

This and other objects of the present invention will become more readily apparent in the following description, taken with the drawings, in which.

Figure 1:
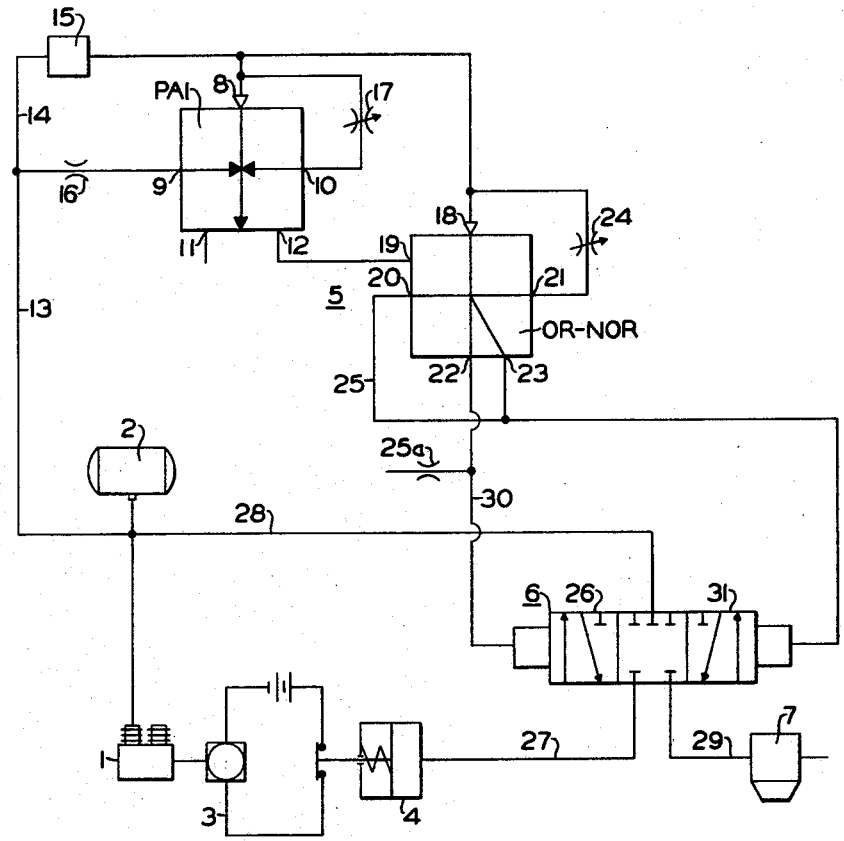
FIG. 1 is a schematic view of a fluid compressor showing my invention.

Referring now to FIG. 1 of the drawing, there is shown a fluid compressor 1 for charging a main reservoir 2 in response to a compressor control system 3 which in turn is controlled by a pressure operated switch 4. A fluidic governor generally indicated at 5 senses predetermined upper and lower limits in the main reservoir to correspondingly operate an interface valve 6 to operate both the fluid pressure operated switch and a main reservoir drain valve 7 in a manner hereinafter described in detail.

The aforementioned fluidic compressor governor 5 comprises a conventional pure fluid proportional amplifier device PA1 and a conventional pure fluid OR-NOR device for sensing predetermined upper and lower limits of main reservoir pressure to provide an output pressure correspondingly positioning the interface valve device 6.

The portional amplifier PA1 includes a supply port 8, a pair of opposing control inputs 9 and 10 and a pair of outputs 11 and 12. The supply input 8 is communicated with main reservoir 2 by piping 13, branch piping 14 and a regulating valve 15 which regulates main reservoir pressure to provide a supply pressure suitable for operation of pure fluid devices. The control input 9 is communicated to pipe 13 through a pressure dropping choke 16 so that pressure at control input 9 is substantially proportional to main reservoir pressure and yet is sufficiently reduced to provide pressure within a range suitable for operation of pure fluid devices. The control input 10 is communicated with supply branch pipe 14 via a variable choke 17, thereby providing a variable bias pressure at input 10 in opposition to pressure at control input 9. Output 11 is communicated to atmosphere, while output 12 is communicated with the OR-NOR device in a manner and for a purpose hereinafter described.

In order to facilitate a better understanding of the hereinafter described operation of the fluidic compressor governor 5 as a unit, the operation of the proportional amplifier PA1 in the aforementioned circuitry will now be described.

As is well-known to those familiar with the art, the characteristic curve of a conventional pure fluid proportional amplifier indicates that the proportional gain at the output for a given low range of input pressure is less than the proportional output gain at a given higher range of input pressure. This characteristic is here utilized to advantage by providing adjustment of the bias to offset the operation of a proportional amplifier to different operating regions of the characteristic curve, depending upon the adjustment of the bias, for the purpose hereinafter described.

The OR-NOR device includes a supply port 18 communicated with the aforementioned fluid supply branch pipe 14, a pair of control inputs 19 and 20, a bias input 21, a NOR output 22 and an OR output 23. A variable choke 24 communicates the bias input 21 to fluid supply branch pipe 14. The aforementioned control input 19 is communicated directly to output 12 of the previously described proportional amplifier device PA1, and, when pressurized to exceed the bias input pressure at bias input 21 a predetermined amount, switches output pressure from the NOR output 22 to the OR output 23 and to control input 20 by way of a latching loop 25. Preferably, choke 25a is provided to communicate the NOR output 22 to atmosphere to inhibit undesired oscillation of the OR-NOR device and thereby stabilize its operation.

In now describing the operation of the OR-NOR device, taken alone, it will be assumed that pressure at control input 19 assumes a first pressure exceeding the bias pressure at bias input 21 by the amount required to switch pressure from the NOR output 22 to the OR output 23. Under this condition, output pressure is applied by a latching loop 25 to control input 20. The pressure thus applied to control inputs 19 and 20 additively oppose the bias input, and, since the pressure at control input 20 is constant so long as OR output 23 is pressurized, the OR-NOR device will not switch pressure from the OR output 23 to the NOR output 22 until control pressure at input 19 reduces to a second pressure substantially below the aforementioned first pressure for the reason that the sum of control pressures at inputs 19 and 20 must reduce to a level providing a small differential between the combined input pressures at control inputs 19 and 20 relative to the bias input 21 to effect switching of pressure to the NOR output 22, thereby depressurizing output 23, latching loop 25 and control input 20. At start-up, the OR-NOR device always assumes the switched condition in which NOR output 22 is pressurized.

In now describing the operation of the fluidic compressor governor 5, it will be assumed that the main reservoir is at a low or atmospheric pressure and that the variable chokes 17 and 24 are each initially adjusted to any point in a median range. Under these conditions, all piping is depressurized, and fluid pressure switch 4 is in the position shown to close the electrical compressor control circuit 3 which in turn operates the compressor 1 to begin charging main reservoir 2.

As main reservoir pressure increases, pressure is provided through piping 13 and 14 and regulator valve 15 to supply ports 8 and 18 of devices PA1 and OR-NOR, respectively, and to bias inputs 10 and 21, respectively, in accordance with the settings of variable chokes 17 and 24, respectively. At the same time, the PA1 device responds to the proportionately increasing pressure at control input 9 to provide a proportionately increasing pressure at output 12 and control input 19 of the OR-NOR device. In the OR-NOR device, before the pressure at control input 19 has reached the switching level, the OR output is depressurized and the NOR output is pressurized, which in turn pressurizes piping 30 to dispose or maintain interface valve 6 in position 26 venting fluid pressure valve 4 via piping 27 and applying main reservoir pressure via piping 28 and 29 to drain valve 7 which operates in a fashion well-known in the art to momentarily vent main reservoir 2.

As main reservoir pressure further increases, thereby proportionately increasing pressure at control input 19 of the OR-NOR device, the pressure at control input 19 will increase to a level above the bias pressure at bias input 21 sufficient to switch the OR-NOR device to pressurize OR output 23 and depressurize NOR output 22, whereupon control input 20 is pressurized by a latching loop 25, and the right end of interface valve 6 is pressurized to switch interface valve 6 to position 31. Thereupon, pressure switch 4 is operated to open control circuit 3 to stop the compressor 1. At this time the pressure in main reservoir 2 is at its upper limit and begins to decrease as fluid pressure operated apparatus, not shown, uses the fluid compressed therein.

In the OR-NOR device, the control pressures at control inputs 19 and 20 additively oppose bias input pressure at input 21. Therefore, since the combined pressures at control inputs 19 and 20 must reduce to a predetermined level relative to the bias pressure at input 21 in order for the OR-NOR device to switch pressure back to NOR output 22, and since the pressure at control input 20 is constant so long as NOR output 23 is pressurized, it is apparent that control pressure at input 19 of the OR-NOR device will reduce substantially below the pressure required at input 19 to switch the OR-NOR device to pressurize OR output 23 in the manner previously described. Thus, main reservoir pressure will reduce substantially below the aforementioned upper limit and effect the required pressure reduction at PA1 device output 12 and OR-NOR device input 19, whereupon the OR-NOR device will switch to its first described position to depressurize OR output 23 and latching loop 25, and pressurize NOR output 22, piping 30 and the left end of interface valve 6 to restart the compressor 1 and operate the drain valve 7. At this point, the main reservoir pressure is at its lower limit and will now begin to increase as the compressor 1 continues to operate.

If now it is desired to increase the upper limit of main reservoir pressure, choke 24 is adjusted to increase the bias pressure at bias input 21, therefore requiring a correspondingly higher pressure at control input 19 to switch the OR-NOR device to pressurize OR output 23. Accordingly, main reservoir pressure will achieve a higher pressure sufficient to provide at output 12 of the PA1 device a higher pressure sufficient to overcome the increased bias at bias input 21. Conversely, to decrease the upper limit pressure, choke 24 is adjusted to decrease bias pressure at bias input 21 so that a correspondingly lower pressure in the main reservoir will provide pressure at output 12 of the PA1 device and input 19 of the OR-NOR device to switch pressure to the OR output 23.

If, instead of increasing the upper limit of main reservoir pressure it is desired to lower the lower limit of main reservoir pressure, choke 17 is adjusted to increase bias pressure at bias input 10 of the PA1 device, and the choke 24 is adjusted to decrease bias pressure at bias input 24. By the adjustment of variable choke 24, a lower pressure is sufficient at control input 19 to switch the OR-NOR device, which adjustment when considered alone would appear to lower the upper limit of main reservoir pressure. However, the aforementioned adjustment of choke 17 biases the PA1 device to a lower gain region of operation having an upper limit determined by the adjustment of variable choke 24 as above described, so that a proportionately greater variation in main reservoir 2 is required to effect change in output pressure at output 12 necessary to effect switching of the OR-NOR device, that is, the main reservoir pressure must now drop to a lower value in order to decrease pressure at output 12 sufficient to provide switching of the OR-NOR device to pressurize the OR output 22. Thus, it is seen that by appropriate adjustment of either or both the variable chokes 24 and 17, the upper limit of the main reservoir pressure may be changed or maintained while the lower limit of reservoir pressure may be maintained or changed, as desired.

The compressor governor may be calibrated by recording upper and lower limits of main reservoir pressure for various combinations of choke settings for variable chokes 17 and 24.

Figure 2:
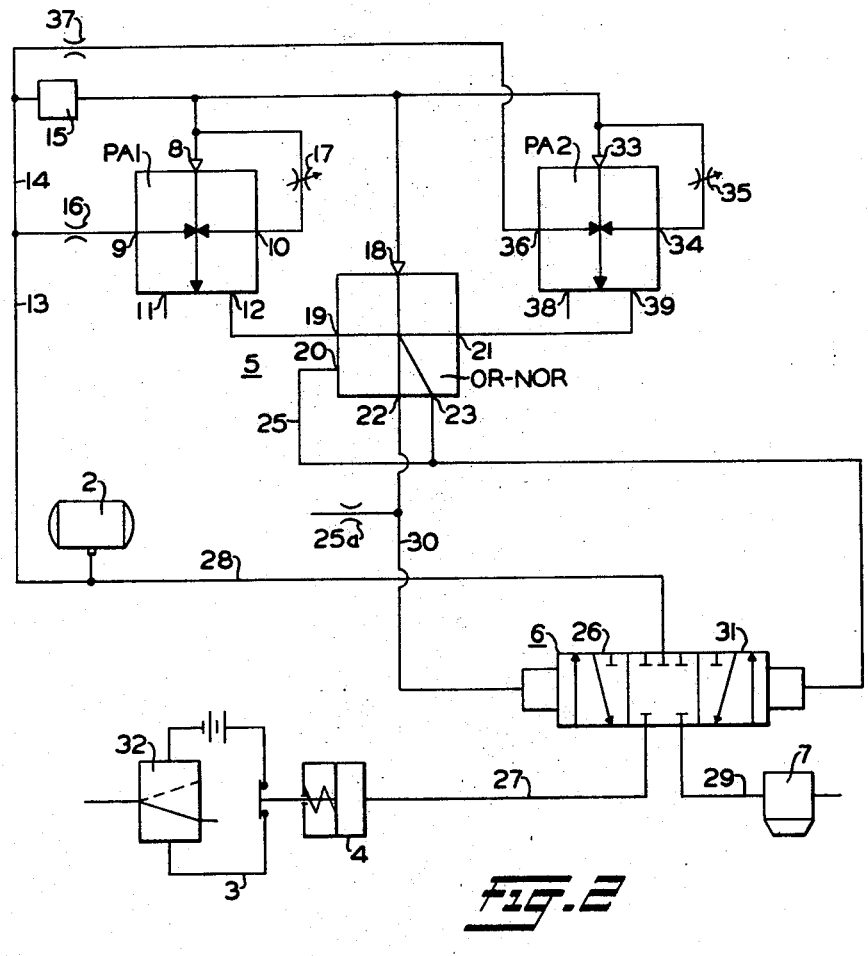
FIG. 2 is a schematic view of a fluid compressor showing a second embodiment of my invention.

Referring now to FIG. 2 of the drawing there is shown a modification of the compressor governor of FIG. 1, corresponding parts bearing the same reference numerals. FIG 2 differs over the disclosure of FIG. 1 in that the fluid pressure operated valve 4 operates a compressor control apparatus comprising a conventional load-unload valve 32, the structure and operation of which is well-known in the art. In addition, a second pure fluid proportional amplifier device PA2 is provided to pressurize the bias input 21 of the OR-NOR device.

The PA2 device includes a supply port 33 communicated with branch pipe 14, a bias input 34 communicated with branch pipe 14 via variable choke 35, a control input 36 communicated with branch pipe 14 by a choke 37, a first output 38 communicated with atmosphere, and an output 39 communicated with control input 21 of the OR-NOR device.

In now describing the operation of the compressor governor of FIG. 2, it will be seen that as main reservoir pressure changes, the control pressures at control inputs 9 and 36 of devices PA1 and PA2, respectively, simultaneously change in direct proportion therewith. If now the variable choke 35 is adjusted to provide at bias control input 34 a bias pressure higher than the bias pressure at control input 10 as determined by variable choke 17, thus biasing the PA2 device to operate on a lower gain region of its characteristic curve, the change in pressure at output 39 per unit change in pressure in the main reservoir will be less than the change at output 12 of the PA1 device. Accordingly, as main reservoir pressure increases, pressure at control input 19 of the OR-NOR device will rise faster than the pressure at bias input 21, thereby increasing the pressure differential between inputs 19 and 21 until such differential is of sufficient magnitude to switch the OR-NOR device to pressurize output 23 to unload the compressor. Thereafter, as main reservoir pressure decreases, the pressure differential between inputs 19 and 21 decreases until below that required to maintain the OR-NOR device in the above-described switched condition, at which time the OR-NOR device switches pressure to the NOR output to load the compressor to charge main reservoir.

From the foregoing, it will be apparent that by appropriate adjustment of variable chockes 17 and 35, the change in pressure differential between inputs 19 and 21 of the OR-NOR device may be adjusted to occur faster or slower per unit change in main reservoir pressure, thereby broadening or narrowing the differential between upper and lower limits of main reservoir pressure, while changing either or both the upper or lower pressure limits in the main reservoir, depending on the combination of settings of the variable chokes 17 and 35.

From the foregoing, it will be apparent that the governor disclosed in FIG. 2 is capable of providing a broader range of main reservoir upper and lower pressure limits than the governor disclosed in FIG. 1.

It will be understood that the electrical control circuit for the fluid compressor of FIG. 1 and the load-unload valve for operation of the compressor as shown in FIG. 2, are conventional and may be interchanged without departing from this invention.

Having now described the invention, what we claim as new and desired to secure by Letters Patent is:

1. A compressor governor, comprising:
   (a) a pure fluid proportional amplifier device, comprising:
      (i) a first control input and an output pressurizable in accordance with pressurization of said first control input; and
      (ii) a second control input opposing said first control input;
   (b) means for connecting said first control input to a main reservoir;
   (c) means for connecting said second control input to a source of bias pressure;
   (d) a pure fluid bi-stable device, comprising:
      (i) a third control input connected to said output of said proportional amplifier device;
      (ii) a fourth control input; and
      (iii) a pair of outputs selectively pressurizable in accordance with the pressure differential between said third and said fourth control inputs;
   (e) means for connecting said fourth control input to a source of bias pressure; and
   (f) means operable in response to selective pressurization of said pair of outputs to provide control pressure for operating a compressor control apparatus to charge the main reservoir.

2. A compressor governor, as recited in claim 1, in which said means for connecting said second control input to a source of bias pressure includes a variable choke means.

3. A compressor governor, as recited in claim 1, in which said means for connecting said fourth control input means to a source of bias pressure includes variable choke means.

4. A compressor governor, as recited in claim 2, in which said means for connecting said fourth control input means to a source of bias pressure includes variable choke means.

5. A compressor governor, as recited in claim 1, in which:
   (a) said pure fluid bi-stable device comprises an OR-NOR device including a fifth control input supplementing said third control input;
   (b) one of said pair of outputs comprises a NOR output;
   (c) the other of said pair of outputs comprises an OR output; and
   (d) said OR output is connected to said fifth control input.

6. A compressor governor, as recited in claim 1, in which:
   (a) said means for connecting said fourth control input to a source of bias pressure comprises a second pure fluid proportional amplifier device;
   (b) said second pure fluid amplifier device comprising:
      (i) sixth and seventh control inputs;
      (ii) a fourth output connected to said fourth control input and pressurizable in accordance with pressurization of said sixth control input;
   (c) means for connecting said sixth control input to said main reservoir; and
   (d) means for connecting said seventh control input to a source of fluid pressure.

7. A compressor governor, as recited in claim 6, in which said means for connecting said seventh control input to a source of bias pressure comprises variable choke means.

References Cited

UNITED STATES PATENTS

| | | |
|---|---|---|
| 2,727,525 | 12/1955 | Harris. |
| 3,124,999 | 3/1964 | Woodward. |
| 3,246,661 | 4/1966 | Bauer. |
| 3,261,372 | 7/1966 | Burton. |
| 3,405,726 | 10/1968 | Wood. |
| 3,429,248 | 2/1969 | Furlong. |
| 3,443,575 | 5/1969 | Hughes. |
| 3,448,483 | 6/1969 | Jones. |

WILLIAM L. FREEH, Primary Examiner

U.S. Cl. X.R.

137—81.5; 230—24